No. 823,460. PATENTED JUNE 12, 1906.
A. F. BINGENHEIMER.
FISH HOOK.
APPLICATION FILED JULY 17, 1905.

Witnesses
Albert F. Bingenheimer, Inventor
By George Wetmore Colles
Attorney

UNITED STATES PATENT OFFICE.

ALBERT F. BINGENHEIMER, OF MILWAUKEE, WISCONSIN.

FISH-HOOK.

No. 823,460.　　　Specification of Letters Patent.　　　Patented June 12, 1906.

Application filed July 17, 1905. Serial No. 269,945.

*To all whom it may concern:*

Be it known that I, ALBERT F. BINGENHEIMER, of Milwaukee, Wisconsin, have invented a Fish-Hook, of which the following is a specification.

This invention relates to fish-hooks used by anglers, more particularly in trolling or that species of fishing wherein the hook and bait are dragged through the water to attract fishes, and more particularly to devices for preventing the entanglement of weeds with the hook. Such hooks are often attached to artificial baits.

The main fault of most of the so-called "weedless" hooks is that they are nearly if not quite as fishless as they are weedless.

In my invention I provide a weed-guard such that the device may be used without trouble in the thickest weeds and at the same time such that it will never interfere with the strike.

My invention may best be understood from a consideration of the following description thereof, reference being had to the accompanying drawings.

Figures 1, 3:
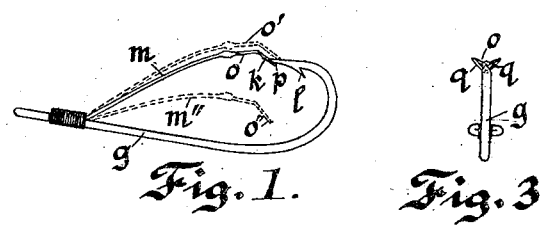
Figure 2:
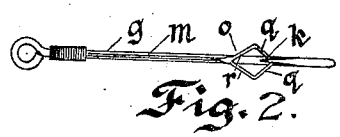
Figure 4:
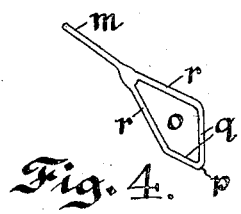

Figures 1, 2, and 3 are respectively a side, plan, and end view of a hook provided with my improved weed-guard; and Fig. 4 is a perspective view of the loop of said guard on an enlarged scale.

The weed-guard attached to the hook $g$ forms perhaps the essential element of my invention, in that it has an advantage over prior guards, as will be seen, in preventing the engagement of the hook with weeds, while at no time interfering with the closing of the mouth of the fish over the hook and the engagement of the point thereof with the fish's mouth. This weed-guard comprises a wire $m$, attached to the base of the hook by a fine-wire binding $n$ or in any other suitable manner and having at its end a skew-diamond-shaped loop $o$, having at its tip a pointed angle $p$, which lies adjacent to and either over or under the point $k$ thereof.

The essential feature of the improvement lies in the formation of the loop with the angle $p$ and the straight sloping sides $q$ at either side of the angle $p$, which make an angle of from sixty to ninety degrees with each other and, as shown, lie in a plane oblique to the point $k$. The base portions $r$ of the loop are likewise shown as straight and making angles with the portion $q$; but it is, comparatively speaking, immaterial how the portions $r$ extend, as the active part of the loop is contained in the V-shaped portion included by the sides $q$ and the angle $p$. The guard $m$ is shown as attached to an ordinary fish-hook $g$, and its shape—that of a skew quadrilateral—is clearly shown in the drawings. The angle $p$ of the loop may lie either under the point $k$, as shown in the full lines of the drawings, or above said point, as shown by the dotted position $o'$, Fig. 1, as it serves its purpose as a weed-guard equally well in either position, and in neither position does it interfere with the strike. When the fish closes its mouth over the hook, the weed-guard is depressed into the position $m''$, Fig. 1, and by reason of the angle $p$ the loop $o$, in case it happens to lie in the position $o'$, will readily slide around the point $k$ to reach the position $o''$, whereas in case the loop $o$ lies in the full-line position at the time of the strike any slight sidewise thrust upon it cannot cause the point $k$ to become engaged with the loop so as to prevent its being depressed, as it will in this case slide along the side $q$ of the loop until it passes over the open end thereof. This difficulty, which has been the cause of faulty operation in many weed-guards heretofore devised, is thus eliminated in my weed-guard.

Having thus described my invention, what I claim as new, and desire to secure by Letters Patent, is—

1. In combination with a fish-hook, a yielding support and guard member and a V-shaped member attached thereto and supported yieldingly in proximity to the point of said hook.

2. In combination with a fish-hook, a weed-guard comprising a yielding stem and a loop having a V-shaped extremity the angle whereof is yieldingly supported in proximity to the point of the hook.

3. In combination with a fish-hook, a yielding support and guard member attached to the shank of the hook, and a V-shaped member supported thereby and having an angle $p$ which is yieldingly supported in proximity to the point of the hook, the sides $q$ of said member lying in a plane oblique to the pointed end of said hook.

4. In combination with a fish-hook, a weed-guard comprising a yielding stem secured to the shank of said hook, and a substantially skew-diamond-shaped loop at the end of said stem and yieldingly supported with its tip normally in proximity to the point of said hook, substantially as described.

In testimony whereof I have hereunto set my hand this 15th day of July, 1905.

ALBERT F. BINGENHEIMER.

In presence of—
GERTRUDE H. BOINK,
GEORGE W. COLLES.